(12) United States Patent  
Ferguson (10) Patent No.: US 8,355,567 B2
(45) Date of Patent: Jan. 15, 2013

(54) METHOD AND APPARATUS FOR IMPLEMENTING MOVING IMAGE COLOR APPEARANCE MODEL FOR VIDEO QUALITY RATINGS PREDICTION

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 635 days.

(21) Appl. No.: 12/635,456

(22) Filed: Dec. 10, 2009

(65) Prior Publication Data

US 2010/0149344 A1 Jun. 17, 2010

Related U.S. Application Data

(60) Provisional application No. 61/122,221, filed on Dec. 12, 2008.

(51) Int. Cl.
G06K 9/00 (2006.01)
(52) U.S. Cl. .......................... 382/162; 382/167
(58) Field of Classification Search .................. None
See application file for complete search history.

(56) References Cited

U.S. PATENT DOCUMENTS

| | | | | |
|---|---|---|---|---|
| 5,771,312 A * | 6/1998 | Spitzer | | 382/167 |
| 6,931,152 B2 * | 8/2005 | Spitzer | | 382/167 |
| 6,941,017 B2 * | 9/2005 | Ferguson | | 382/210 |
| 7,489,814 B2 * | 2/2009 | Spitzer et al. | | 382/167 |
| 7,609,318 B2 * | 10/2009 | Zador | | 348/351 |
| 2002/0186894 A1 * | 12/2002 | Ferguson | | 382/261 |
| 2003/0053688 A1 * | 3/2003 | Spitzer | | 382/167 |
| 2003/0152284 A1 * | 8/2003 | Ferguson | | 382/274 |
| 2004/0135898 A1 * | 7/2004 | Zador | | 348/222.1 |
| 2004/0165086 A1 * | 8/2004 | Spitzer et al. | | 348/239 |
| 2007/0200933 A1 | 8/2007 | Watanabe et al. | | |
| 2008/0008360 A1 | 1/2008 | Pattikonda | | |
| 2008/0252748 A1 | 10/2008 | Meka et al. | | |
| 2009/0225226 A1 | 9/2009 | Kakuta | | |
| 2010/0135591 A1 * | 6/2010 | Zador | | 382/255 |

FOREIGN PATENT DOCUMENTS

| | | |
|---|---|---|
| EP | 1771013 A2 | 4/2007 |
| WO | 2006/006081 A2 | 1/2006 |

OTHER PUBLICATIONS

U.S. Appl. No. 12/635,537, filed Dec. 10, 2009.
Garret M. Johnson: "Using Color Appearance in Image Quality Metrics," Proceedings of the Second International Workshop on Video Processing and Quality Metrics for Consumer Electronics, Jan. 31, 2006, Retrieved from the Internet:URL:http://enpub.fulton.asu.edu/resp/vpqm2006/papers06/326.pdf [retrieved on May 28, 2010].

* cited by examiner

*Primary Examiner* — Chan S Park
*Assistant Examiner* — Sean Motsinger
(74) *Attorney, Agent, or Firm* — Matthew D. Rabdau; Michael A. Nelson (57) ABSTRACT

Embodiments of the invention include systems and methods for predicting video quality through human vision perceptual color response and associated perceptual differences of video relative to a reference. Embodiments include a model of the human vision system developed as an extension to CIECAM02 to predict the macro-behavioral response to light stimuli with the following varying parameters, in addition to the parameters relevant to CIECAM02: spatial frequency, temporal frequency, angular extent, temporal extent, and surround.

20 Claims, 6 Drawing Sheets

METHOD AND APPARATUS FOR IMPLEMENTING MOVING IMAGE COLOR APPEARANCE MODEL FOR VIDEO QUALITY RATINGS PREDICTION

CROSS REFERENCE TO RELATED APPLICATIONS

This application claims the benefit of U.S. Provisional Application No. 61/122,221 filed Dec. 12, 2008, which is incorporated herein by reference.

This application is related to U.S. application Ser. No. 12/635,537, filed Dec. 10, 2009, entitled METHOD AND APPARATUS FOR AUTOMATIC ILLUMINANT COMPENSATION IN VIDEO SURVEILLANCE, which claims the benefit of U.S. Provisional Application No. 61/122,221 filed Dec. 12, 2008, which is incorporated herein by reference.

FIELD OF THE INVENTION

This disclosure is related to video test and measurement equipment, and more particularly to picture quality measurements for video.

BACKGROUND

When video or image stream is manipulated, for example when a video is compressed so that it may be stored on a DVD or transmitted over a television channel, or when video is transcoded from one format to another, the manipulations introduce artifacts from the compression or conversion into the resultant video. Sometimes these artifacts are invisible or imperceptible to human viewers, due to physiology and phenomena of the human eye and the way it perceives light and motion. Other times the artifacts are plainly visible. It is nearly impossible to determine how manipulated video will be perceived by simply analyzing the resultant video data.

Instead, video quality is best determined by a survey of a statistically significant number of people gathered to grade the quality of the video. Audiences watch the video and grade it on a predetermined quality scale. Such audience surveys, however, are impractical and cost prohibitive for most applications, and thus methods of automating picture quality rating were developed.

Full reference (FR) picture quality analyzers are machines that compare two images, or two image streams, and generate a "score" or other measure of how humans would perceive the quality of the video conversion, or the match between the original and the modified test streams. A high score indicates a high-quality conversion, whereas a low score indicates that the resultant video is a poor representation of its original.

A disconnect exists, though, in that the state of the art picture quality analyzers either 1) do not include color analysis in their calculations on video quality or 2) include simple objective measures such as color PSNR (peak signal to noise ratio) or color impairment measurements such as blocking or ringing, but do not take into account the human vision system's adaptation mechanisms causing drastic changes in sensitivity to color changes depending on spatiotemporal contexts.

An example picture quality measurement device that does not include color analysis in their calculations on video quality is the Tektronix PQA500. Analysis is made on luminance (light intensity) values only. Although there have been published proposals of adding filters to color appearance models, they so far have been fixed models (such as static Gaussian spatial filters). In the luminance perception model of the PQA500, adaptive response is relative to an integrated adaptation point represented as the output of a "surround" spatiotemporal filter with upper resolution in time and space set by a "center" spatiotemporal filter. This luminance only method, being state of the art for detecting perceptible errors in intensity, has been quite sufficient for most video transmission system assessment applications, mostly due to the tendency for luminance error and chroma error to correlate well. However, increasingly complex systems and flexibility in encoders and other video processing devices has lead to increased chances of impairments primarily seen as color errors. For example, in video broadcast and webcast, oftentimes colorimetry of input video and one or more processing or display components is mismatched; out of gamut colors may be clipped, and in some cases out of gamut colors may overflow into an opposite color. Luminance analysis fails to detect the majority of these errors, and consequently the quality rating becomes inaccurate.

Embodiments of the invention address these and other limitations in the prior art.

DETAILED DESCRIPTION

Color perception adaptation in human eyes causes a given constant physical light stimulus to appear to have a different color when the surround or environment changes, or when viewed after seeing other colors. In general, dynamic light stimuli generally causes perceptions of given static light stimuli to appear to change due to changes in space and/or time. This apparent change of color appearance due to adaptation has a time course that depends on a number of stimulus conditions.

Cognitive discounting of illumination and white point allows humans to view an apple against a white background illuminated by red light only and still determine if the apple is red or green and if the background is red or white. Knowing that the white background is white, even though it appears as red as the red illuminant, is an example of cognitive discounting. In some applications, it is desirable to discount this type of overall color shift (towards the illuminant color in this example), while in other cases discounting is undesirable. It is commonly desirable for white balance matching between scenes in a movie or TV show, so differences in colors due to shifts of the sun's position in the sky or inadvertent changes in studio lighting are undesirable. On the other hand, if it is desired to assess the perceptibility of codec related impairments on a consumer LCD TV with standard colorimetry versus a computer monitor with a VESA standard colorimetry (bluer white point) displayed via an internet browser, it is undesirable to include these differences in color standard in the picture quality measurement. Therefore, in order to cover these two cases and others in between when making picture quality measurements, it is important to have continuous control cognitive discounting from none to full.

Depending on the agility of one's gaze, perceptual color adaptation can become very localized, for example if one stares at a fixed point for a relatively long time the sensation of color is reduced. Alternatively, color adaptation can become primarily global based on the biases such as the non-white illumination or other color bias from the image. Localized color adaptation effects from long gazes at fixed points can cause color after-images that in effect are a result of desensitization of the eye to certain colors. In some applications the prediction of these localized adaptation affects, which can be most dramatic, are important for predicting video quality. In other applications, perhaps only the global effect is of interest. For example, when predicting video quality scores such as DMOS (difference mean opinion score) made by taking the mean numerically scored video quality opinions of approximately two dozen individuals (i.e. as per ITU-R BT.500), it has been shown that predicting the precise locations of focus of attention improves prediction accuracy, such as described in US Publication 2008/0267442 entitled Systems and Methods for Predicting Video Location of Attention Focus Probability Trajectories Due to Distractions. In such a case, localized color adaptation in smaller areas of focus would be appropriate in order to simulate the most probable fixation trajectories in aggregate, and the associated local adaptation that occurs. For a counter example, in other cases, for example when a production house is mastering a Blu-ray DVD, it may be desired to assess any possible perceptible color change in every spot as if focus of attention is equal everywhere, and thus fixation is randomized. In this case, only the overall aggregate, approximately average, color would be used for simulating adaptation. And, as there are cases in between these extreme examples, it is most preferable to have a continuous control to accommodate all cases.

The International Commission on Illumination, abbreviated as CIE because of its official French name of Commission internationale de l'éclairage, has created several improved color appearance models (CAMs) since the original CIE Luv was introduced in 1976. The current, and most accurate CAM, is the international standard CAM known as CIECAM02, which is incorporated by reference herein. A subset of the CIECAM02 development team has developed still image color appearance models based on CIECAM02: iCAM and iCAM06, both of which include spatial processing for images, the latter with extra processing to handle high dynamic luminance range. These are not yet international standards, however, and do not account for changes in viewing distance or similar factors affecting spatial response. Meanwhile, CIECAM02 has found wide acceptance for its original use, which was primarily for reflected light applications such as matching paints in different lighting environments. The reflected light application represents a smaller gamut than direct light, excluding the extremes in saturation and luminance levels. For current broadcast video standards and the maximum luminance output of most commercial display technologies, however, the video gamut mostly overlaps the CIECAM02 target. While CIECAM02 takes into account color adaptation, it requires an input of the level of adaptation and does not include any temporal dimension to the input or output. In other words, CIECAM02 is designed to work with static color patches having static surround and static lighting.

A highly adaptable moving picture color appearance model improves methods of predicting subjective video quality, allowing the comparison of dissimilar displays, image sizes, viewing environments, frame rates and video quality classes. The combination of adaptable spatiotemporal luminance response and the CIECAM02 "static patch" predicting color appearance model is detailed, with additional techniques using color center-surround spatiotemporal filtering, including a new temporal surround filter. Example model temporal surround response test results compare well with human vision perceptual response.

Figure 1:
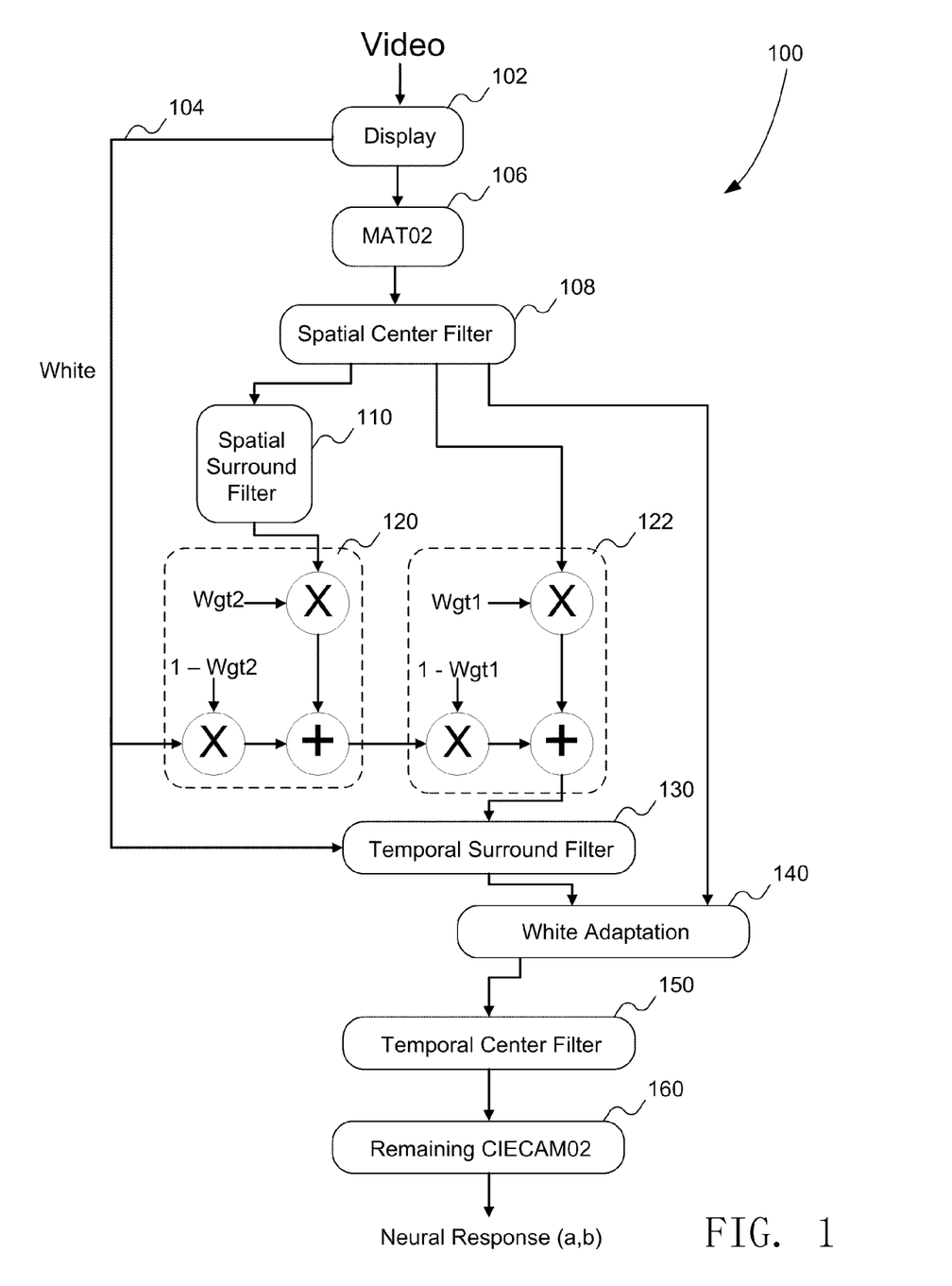
FIG. 1. is a functional block diagram of a system that implements a color analysis for moving images according to embodiments of the invention.

FIG. 1. is a functional block diagram of a system 100 that implements a color analysis through macro-behavioral simulation of the human vision system for moving images according to embodiments of the invention. In general, a video signal is applied to the system 100 which generates a value, or series of values called a Neural Response. The transformed, normalized differences between the test and reference spatial and temporal aggregates of these neural responses reflect Subjectively Classified Perceptual Responses such as just noticeable differences and/or perceptually equal increments. These Subjectively Classified Perceptual Responses reflect how a person rating the test video signal would rate the quality of the video signal relative to an original, reference video signal.

The system 100 generally follows a CIECAM02 process to obtain at least two channels {a,b} (& "orthogonal" {ac,bc}, though no net advantage was seen) color response. Different from the standard process, the system 100 includes a display model to convert standard digital video into light units for input as required by CIECAM02, appropriate adaptive spatial and temporal processing to account for color perception of moving images, and further includes controls for levels of cognitive discounting and color adaptation localization.

Initially, a video signal is applied to a simulated display 102, which, in some embodiments, produces a tristimulus CIE1931 XYZ output based on the type of display it is simulating, such as CRT, LCD, DLP, etc. A portion of simulated output from the simulated display 102 includes a "white" component value 104, which includes factors for the white values from the display 102 combined with a standard white value as well as ambient white. The white component value is provided to a temporal surround filter 130, described in detail below, as well as to a mix controller 120, also described below.

The output from simulated display 102 is converted through a conversion matrix 106, such as an MAT02 matrix as per the CIECAM02 standard, into pre-adapted RGB cone responses, which are then fed to a spatial center filter 108. Because each of the separate cone responses is separately filtered, there are three spatial center filters 108 in the system 100 depicted in FIG. 1, one each for the Red, Greed, and Blue cone responses.

The spatial center filters 108 may be set to produce a $2^{nd}$ order linear (non-adaptive) mirrored IIR filter response. An example implementation uses the adaptive spatial center (sc) filter of U.S. Pat. No. 6,907,143, entitled Adaptive Spatio-Temporal Filter for Human Vision System Models with adaptation control set to 0 and filter coefficients set as illustrated below in Table 1. The preferred set corresponds to the first value for each filter parameter. The range is given to reflect different reasonable values for examples of humans with normal vision.

TABLE 1

Spatial Center Filter: 2nd order linear (non-adaptive) mirrored IIR filter:
@ 32 Samples/deg:
    Range of ~calibrated coefficients (3 possible sets):
        b0rsc = b0gsc = 0.357071, b0bsc = 0.214243
        OR
        b0rsc = 0.357071 OR 0.321364 OR 0.321364
        b0gsc = 0.357071 OR 0.257091 OR 0.257091
        b0bsc = 0.214243 OR 0.205673 OR 0.143971

The cone responses passed through the spatial center filter 108 are then used as inputs to a spatial surround filter 110. Again, there are three separate spatial surround filters 110, one each for the Red, Green and Blue signals. Similar to the mix controller 120, mentioned above, outputs from the spatial center filters 108 are provided to a mix controller 122, which, in conjunction with the previously mentioned mix controller 120, provide a user with the ability to control how much weighting effect is provided to the inputs of the temporal surround filter 130, which is described in detail with reference to FIG. 2.

In the system 100 of FIG. 1, the filters 108, 110, 130 and 150 are applied as aggregate or "lumped" spatial and/or temporal response as an approximation of the combination of spatial and temporal response of each anatomical component of the human vision system. Note that unlike linear systems, the point in the processing chain in 100 where filters are applied is important. With linear systems, filtering may be placed before or after the other processes with no effect in system response. However, because of nonlinearities in CIECAM02 that are required to produce accurate predictions of color appearance, the aggregate spatial and temporal center and surround components of the spatiotemporal filtering are preferably placed at key points within 100. Each of the aggregate filters have been carefully placed in the process flow in 100 to minimize non-linearities of subsequent CIECAM02 processing from creating unwanted artifacts such as rectification of intermediate responses. In addition to being optimally placed in the process flow, the static response of CIECAM02 can remain unchanged if the filter coeffients (b0's of the '143 patent reference above) are set to 1.0 for completely transparent spatiotemporal response.

Output from the main filters 108, 110, 130 in the system illustrated in FIG. 1 are further modified by a white adaptation circuit 140, which produces a white adapted cone response for each color channel. These cone responses are then fed to a temporal center filter 150 for a final filtering step. In some embodiments the spatial center filter 108 and the temporal center filter 150 may be combined into a common filter. As illustrated by 160, the system 100 may then apply the remainder of the CIECAM02 processes to finally produce the desired Neural Response.

With reference back to the mix controllers 120, 122, these controllers allow a user to precisely control how much effect to apply from a pair of input signals as a combined output signal. For instance, to control effects of the surround vs. display white point and ambient (room light) factors (adaptation, cognitive discounting, etc.), the mix controller 120 includes inputs of the white component values 104 from the display 102, as well as an output from the spatial surround filter 110. The "White" input to the mix controller 120 represents the pre-adapted RGB cone responses to the combined display white and ambient illumination XYZ light combination. By setting the values for a weighting value "wgt2," the user determines how much of a filtered response from the spatial surround filter 110 is sent to the mix controller 122. The user may set the mix controller 120 such that the white value 104 is 100% dominant and the output from the spatial surround filter 110 is 0% dominant. For pure display and ambient white point adaptation wgt2=0, while for pure spatial surround (each channel normalized to Yw) adaptation, wgt2=1. Other settings allow the user to select any combination value, simply by selecting the appropriate weight value wgt2.

Similarly, with reference to the mix controller 122, to control local vs. global color adaptation, the user may set the weighting value wgt1 to select the mix value of the output from the spatial center filter 108 and the output from the previously set mix output from the mix controller 120, to produce a controlled mixed input to the temporal surround filter 130. The spatial center filter output 108 connects to both the spatial surround filter 130 and two other inputs: the pre-adapted cone response input to the white adaptation circuit 140 portion of CIECAM02 (responsible for color adaptation), and the weighting mechanism, via the weighting value wgt1, in the mix controller 120, to control how much of local vs. global spatial aspect of the adaptation is used. Thus wgt1 controls localization of spatial color adaptation. This reflects effects of fixated vs. roaming gaze. For minimum (no) local color adaptation (detailed after-images), wgt1=0, while for maximum wgt1=1.

Cognitive discounting, which is the ability to compensate for the illuminant, display white, ambient illumination, etc. when identifying colors, may be controlled by a third weighting, termed "wgt3" but not illustrated in FIG. 1. For this compensation, the "white" {Rwd,Gwd,Bwd} input to the controller 120 may be cross-faded to Rw'=Gw'=Bw'=Yw (equivalent to adaptation parameter D=0 in CIECAM02) by setting wgt3=1, where Rw'=wgt3*Yw+(1−wgt3)*Rwd, and likewise for Gwd and Bwd. Further, an additional compensation control factor, wgt4, also not illustrated in FIG. 1, may control the weighting of a blend between the ambient white with the "display" white signal from the display model 102 of FIG. 1. Thus, the "white" signal input to the mix controller 120 may be a blend of ambient white, display white, and absolute or "standard" white, the mix of which is controlled by weighting factors wgt3 and wgt4.

Conventional use of CIECAM02 would correspond to wgt1=0, wgt2=0, ambient=0, display white=illuminant and wgt3=0.

The temporal surround filter 130 is useful for several reasons. First, CIECAM02 already has a mechanism to take into account fixed adaptation relative to "surround" and/or the illuminant, given the percentage of adaptation. One input to CIECAM02 that in part controls adaptation is "adaptation white" {Rw,Gw,Bw} input to 140, used to modify the cone responses according to instantaneous level of adaptation. Likewise in both CIECAM02 and in another reference entitled "An Adaptable Human Vision Model for Subjective Video Quality Rating Prediction Among CIF, SD, HD, AND E-CINEMA," by Kevin Ferguson, published in Proceedings of the Third International Workshop on Video Processing and Quality Metrics for Consumer Products, January, 2007, and incorporated by reference herein, the surround channel is used to modify the center channel to produce the primary adapted spatiotemporal response. So as to leave CIECAM02 static response unchanged, in the system 100 of FIG. 1, the temporal processing is applied to the input for adaptation white processing 140, and thus is treated as the overall surround channel. Recall, too, that the temporal adaptation filter model (as well as all spatial and temporal filtering) is applied to CIECAM02 after image light stimulus is converted into the three pre-adapted (RGB) cone responses in the matrix 106 above.

For each channel, described above, the composite temporal surround filter is a parallel combination of the adaptive integrator based filters mentioned above.

Figure 2:
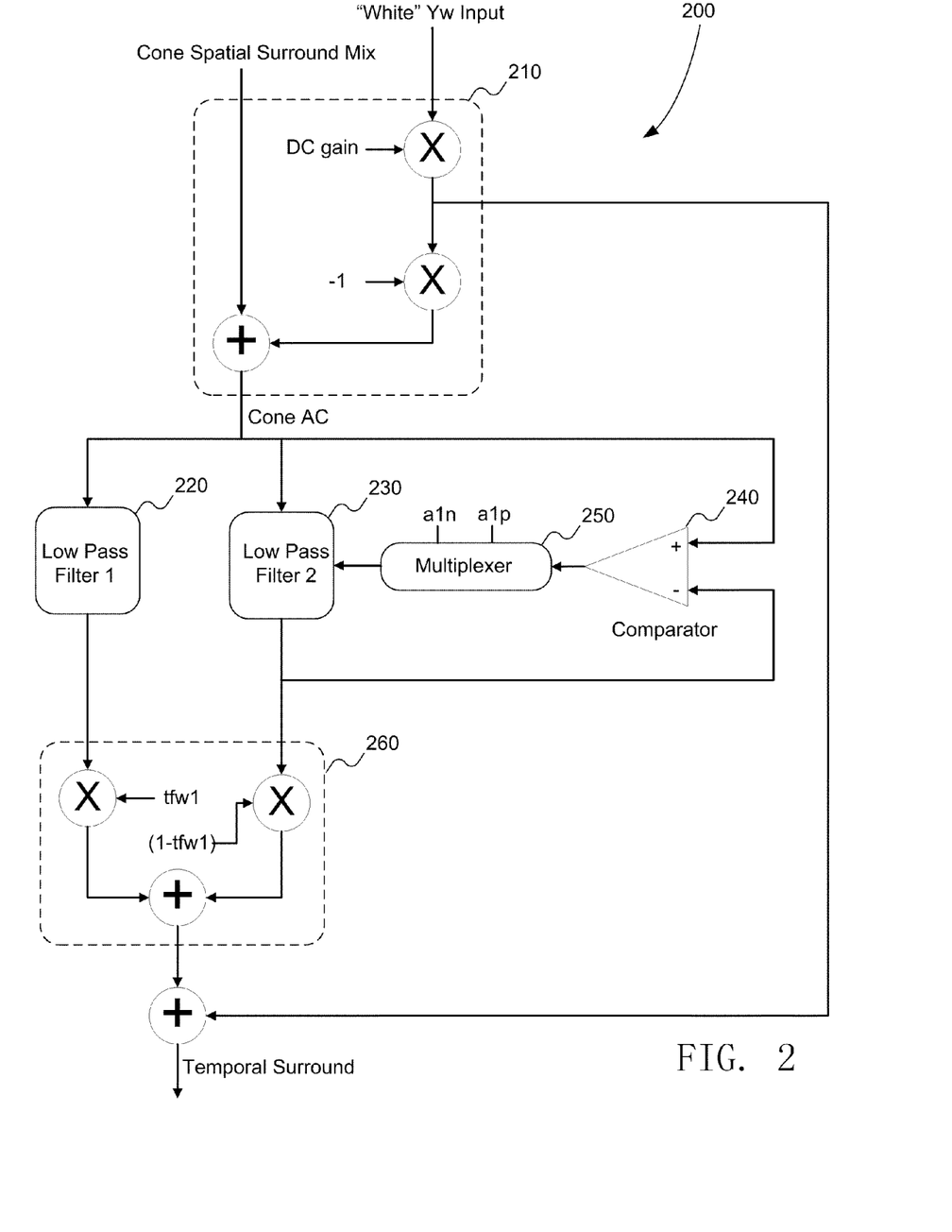
FIG. 2 is a functional block diagram of a temporal surround processing component of the system of FIG. 1 according to embodiments of the invention.

FIG. 2 is a functional block diagram of an example (for one of the three channels of the) temporal surround filter 130 of FIG. 1 giving the description in further detail.

A surround filter 200 includes a "Cone Spatial Surround Mix" input, which was created by the sums of weighted inputs (as described with reference to FIG. 1) to account for localization of color adaptation, the adaptation illuminant and cognitive discounting, is a set of weighted cone responses (a channel each of R, G and B).

A "White" Yw input is the Y portion of the white input (as per CIECAM02). Yw may be either directly input from the display model 104 (FIG. 1) or may be converted back to Yw from the white RGB, otherwise known for example in CIECAM02 as Rw, Gw, Bw. This "White" Yw input is weighted by a "DC gain" factor, for example 0.48, and subtracted from each of the three "Cone Spatial Surround Mix" response inputs in a white processor 210. The result is pre-temporal surround filtered differential or "AC" components of the "Cone Spatial Surround Mix" response. Each channel represents the difference in respective cone response from intensity scaled "adaptation white."

This response is fed to two low-pass filters (LPF), 220, 230, which may be adaptive integrator based IIR low-pass filters. These filters 220, 230 are used in parallel to filter the differential color signals. The LPF 220 is a slow first LPF, which may be an instantiation of the same or similar adaptive temporal surround filter generally used in the Ferguson reference incorporated above, only having updated parameters for zero adaptation and nominal feedback coefficient a1 set to 0.999516 for a nominal sample rate of 60 samples per second. The LPF 230 is a faster LPF, similar to the LPF 220, except that the LPF 230 includes variable coefficients depending on whether its input is less than or greater than its output. A comparator 240 determines which coefficient to select through a multiplexer 250: a1p=0.9854, if the quantity (LPF 230 input minus LPF 230 output) is positive, or a1n=0.99370 if negative. Other coefficients may be used without deviating from the scope of the invention.

The outputs from the LPF 220 and LPF 230 are combined in a combiner 260 using a weighted average by selecting a value for tfw1, as illustrated in FIG. 2. In some embodiments tfw1 can be approximately equal to 0.5. The combined output is created, resulting in the composite filtered differential signal. This resulting composite filtered differential signal is restored to an absolute signal by adding back the intensity scaled white luminance signal 212, which was created by the white processor 210 described above.

Design details of some of the components that may be used to create the temporal surround filter may be found in the Ferguson reference incorporated above, as well as in U.S. Pat. Nos. 6,976,045 and 6,907,143 to Ferguson, both of which are incorporated herein by reference.

Example filter details for LPF 220 and LPF 230 are given in Table 2.

TABLE 2

LPF1: Adaptive Lum Filter of U.S. Pat. No. 6,907,143,
referred to as temporal surround:
    with adaptation parameters = 0 and
        a1 = 0.999516, b0 = 1 − a1
        for sample rate of 60Samples/second.
LPF2: Adaptive Lum Filter of U.S. Pat. No. 6,907,143, TABLE 2-continued referred to as temporal surround:
    with adaptation parameters = 0 and
        a1 = a1n if LPF2 output > LPF2 input, else a1 = a1p:
        a1n = 0.99370
        a1p = 0.9854
        for sample rate of 60Samples/second.

Figure 3:
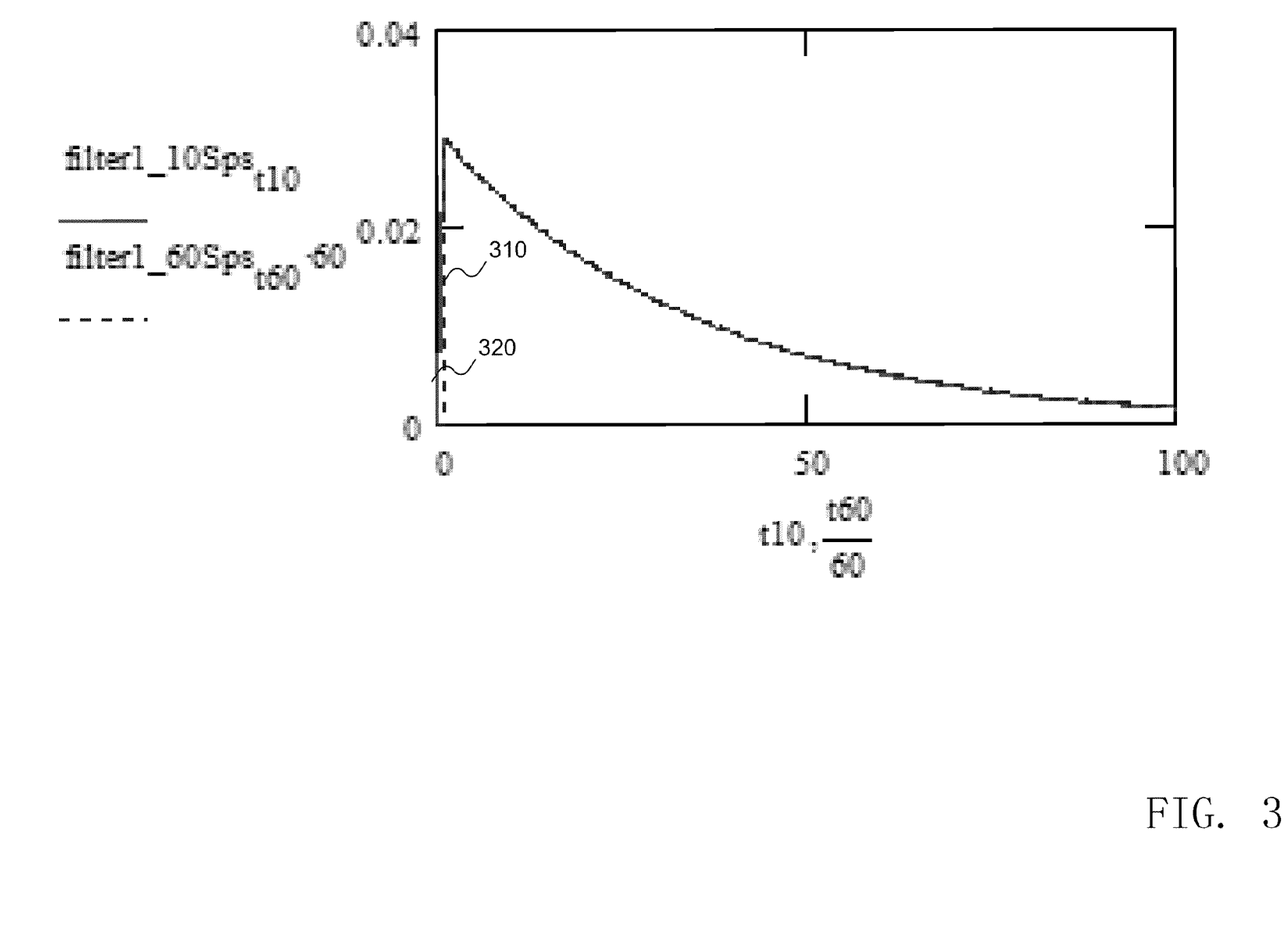
FIG. 3. is a graph that illustrates a Dirac delta impulse response of one of the filters of the temporal surround processing component illustrated in FIG. 2.

The Dirac delta impulse response of LPF 220 for particular inputs is shown in FIG. 3. The two curves 310 and 320 represent 10 and 60 samples per second, respectively. This illustrates an example of maintaining filter response at two different frame rates, the temporal sample rate adaptation requirement met by using the adaptive integrator of the above-incorporated Ferguson reference.

Figure 4A:
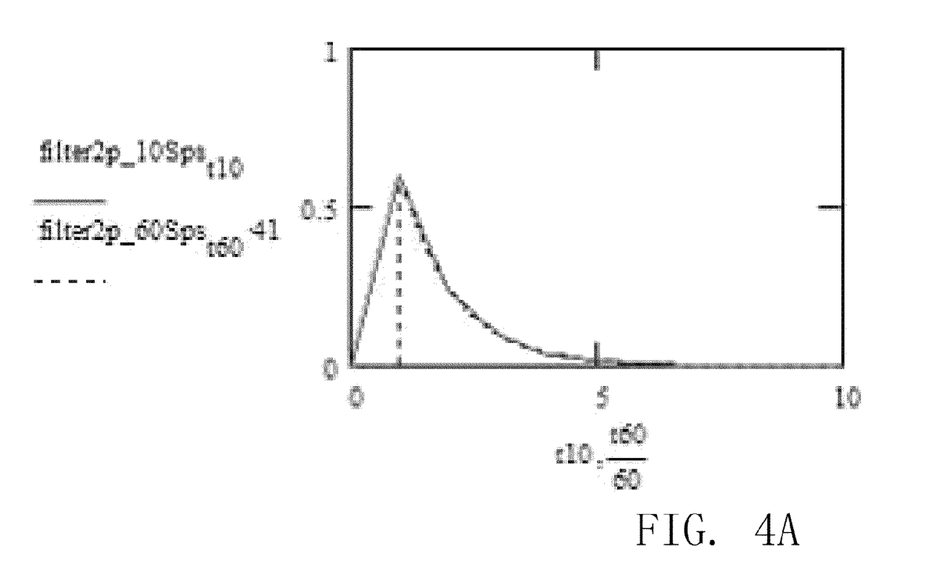
FIG. 4A. is a graph that illustrates the positive Dirac delta impulse response for of one of the filters of the temporal surround filter illustrated in FIG. 2.
Figure 4B:
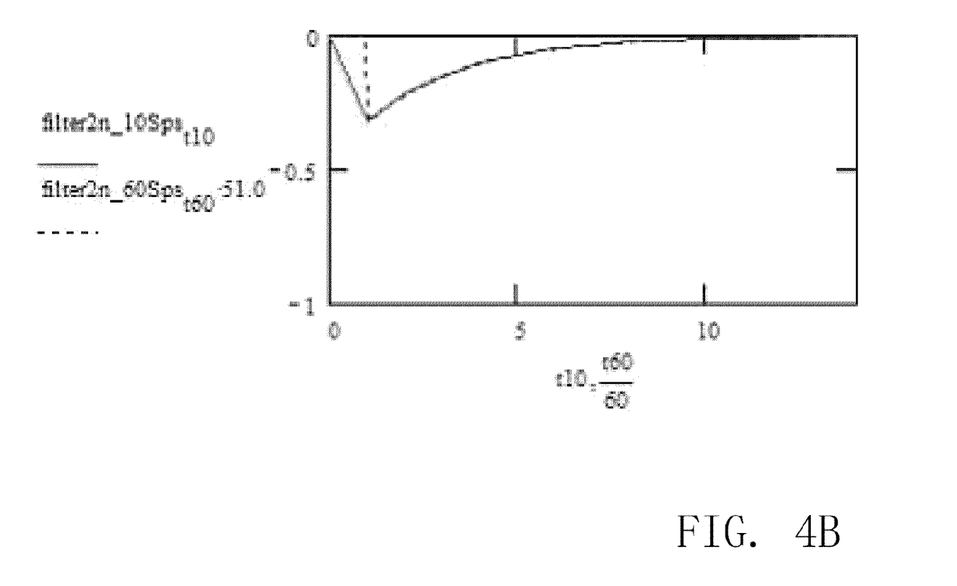
FIG. 4B is a graph that illustrates the negative Dirac delta impulse response for the same filter for which the positive response was illustrated in FIG. 4A.

The overall response for the temporal surround filter 200 is nonlinear primarily due to the difference between responses to positive vs. negative changes accounted for by LPF 230. This can be seen in FIGS. 4A and 4B. FIG. 4A indicates a positive direction response change in two model simulation sample rates, 10 and 60 samples/second shown in solid and dashed lines, respectively, while FIG. 4B illustrates a negative direction response change. Note that the responses are not reflections of one another, which means that there is a different human response depending on whether a color is changing to be more or less white, gray or black (achromatic). An example of this difference in response involves abrupt temporal changes in surround and tracking stimulus changes for achromatic response, as described below.

Tests and Verification

For purposes of calibrating center and surround filters as well as regression testing of the adapted response of CIECAM02 for 2 degree patches, experiments conducted in vision science research were replicated in simulation to check for appropriate responses. Each data set was roughly categorized by stimuli type corresponding to spatial and temporal frequencies and expected responses: near perceptual threshold or relatively constant (equal magnitude) suprathreshold responses.

For both CIECAM02 validation and regression testing after adding filters, a variety of different, well-known data sets were used. Specific well-known data sets were used for temporal center filter calibration, as well as for spatial center filter calibration. Testing results also verified the spatiotemporal combination and temporal surround. Spatial surround data was in part gathered from the combination of the well-known data sets at lowest frequencies. In aggregate, these stimuli also sampled angular and temporal extent.

Of the temporal surround filter data gathered, one experiment was particularly useful for indicating details of longer term temporal response of human color perception. Fairchild and Renif had previously conducted an experiment to track temporal step responses to spatial surround changes. In this experiment, subjects were given the task of maintaining achromatic (grey) appearance of a stationary target patch in the center following a temporal step change in color in the surround. Thus, simulation of this experiment should result in achromatic response using embodiments of the invention, even though input target color (as defined in CIE 1931 xyY, XYZ, etc.) is changing significantly over time.

The direction of changes in input test target color in the color plane (CIE xy or CIECAM02 ab, etc.) required for maintaining achromatic response in the Fairchild and Renif test depend on the direction of the change in surround. Three directions (red, green, blue approximating respective cone response peaks) and their CIE XYZ opposites, for a total of six surround color steps were used. Thus, six time courses (temporal trajectories) were obtained in the experiment.

Figure 5:
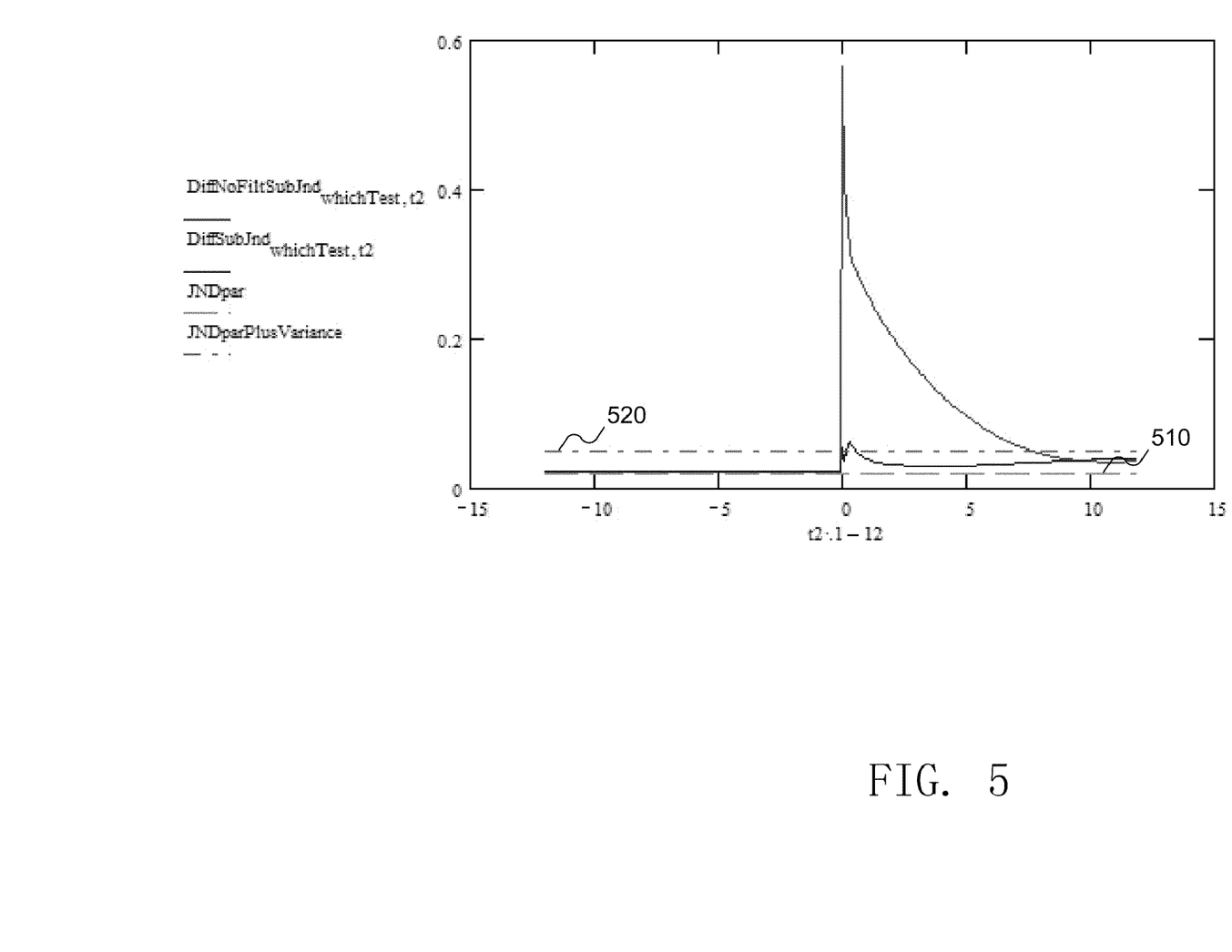
FIG. 5. is a graph illustrating responses using the temporal processing component of FIG. 2.
Figure 6A:
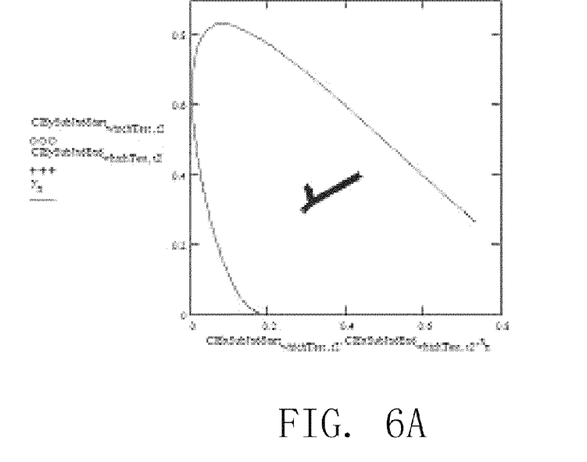
FIG. 6A. is a plot illustrating test stimuli in an CIE 1931 {x,y} plane.
Figure 6B:
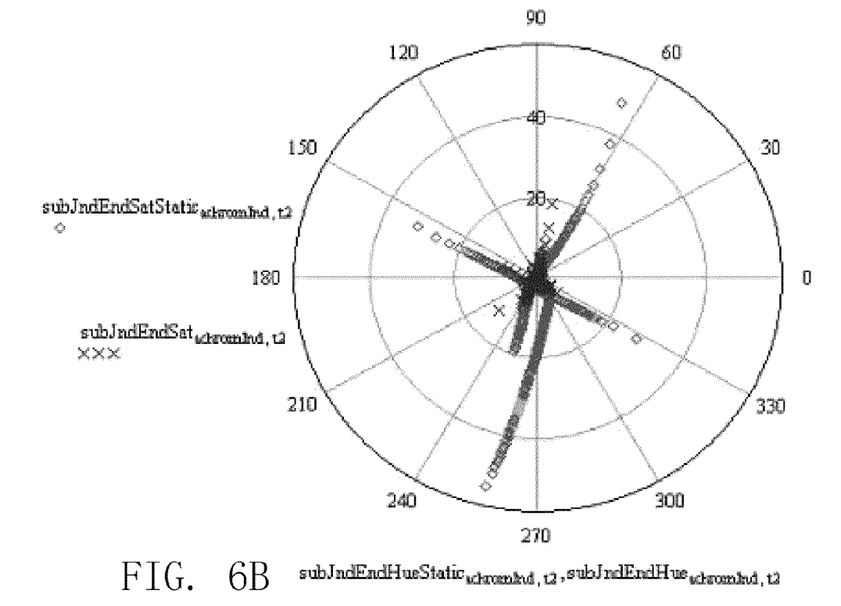
FIG. 6B is a plot illustrating responses with and without processing using the temporal filter illustrated in FIG. 2.

The six stimuli were simulated using CIECAM02 and the temporal surround filter according to embodiments of the invention. An example temporal chromatic response is shown in FIG. 5, depicting CIECAM02 {a,b} magnitude equivalent vs. time (with and without the temporal surround filter). FIG. 5 illustrates a Blue to yellow surround step response for filters: temporal surround sub-JND maximum difference with (low amplitude blue curve) and without filters (high amplitude red curve). Nominal threshold and "guard-band markers" (threshold plus one standard deviation) are illustrated by dashed and dash-dot lines respectively. In FIG. 5, the dashed line 510 represents nominal color difference threshold (~1 JND) from achromatic (no color) whereas the dot-dash line 520 represents the threshold plus 1 standard deviation. The peak chromatic responses shown in FIG. 5 correspond to the maximum excursions of FIGS. 6A and 6B, which illustrate hue-chroma plots for all six surround steps. FIG. 6A shows step stimuli in CIE 1931 {x,y} plane, while FIG. 6B shows responses in CIECAM02 {Saturation, Hue} plane. The origin represents the expected achromatic (colorless) response. Diamonds in FIG. 6B represent CIECAM02 response without any temporal processing, while X's show response once temporal surround processing is added. In this case (including FIGS. 5 and 6), the temporal center filter has been omitted so initial transients cause some of the X's to deviate from the origin somewhat, as can also be seen in the short peak of the response in FIG. 5. Adding the temporal center filter mitigates these transients. Note that these maximum excursions occur at the instant of surround step transition. Therefore, the addition of the temporal center filter according to embodiments of the invention greatly mitigates these deviations from achromatic response. In addition, the spatial filter described above to slightly reduces all six chromatic responses.

Although particular embodiments have been described, it will be appreciated that the principles of the invention are not limited to those embodiments. Variations and modifications may be made without departing from the principles of the invention as set forth in the following claims.

What is claimed is:

1. A method of predicting color visual differences in video, comprising:
   accepting a video signal to be analyzed;
   receiving an unfiltered white signal corresponding to the video display and viewing environment;
   creating a spatial surround from the video signal;
   creating a spatial center from the video signal; and
   creating a temporal surround of the video signal from a combination of the spatial surround, the spatial center, and the unfiltered white signal using one or more weighting factors.

2. The method of claim 1, in which the unfiltered white signal is a combination of one or more of an ambient white signal, a display white signal, and an absolute white signal.

3. The method of claim 2, further comprising:
   combining the ambient white signal and the display white signal according to a first combinational weighting factor to create an intermediate white signal; and
   creating the unfiltered white signal by combining the intermediate white signal and the absolute white signal according to a second combinational weighting factor.

4. The method of claim 1 in which creating a temporal surround comprises temporally filtering data through a variable rate filter.

5. The method of claim 1 in which creating a temporal surround comprises temporally filtering data through an adaptable filter.

6. The method of claim 1 in which creating a temporal surround comprises temporally filtering data through an asymmetric filter.

7. The method of claim 1 in which creating a temporal surround comprises temporally filtering data through a recursive filter.

8. The method of claim 6, in which temporally processing the stream further comprises:
   filtering data though a first and a second low pass filter.

9. The method of claim 8, in which at least one of a set of operating parameters of the second low pass filter varies depending on a color movement direction.

10. The method of claim 8, further comprising adding outputs of the first and second low pass filters to produce the temporal surround.

11. A system for moving image color appearance modeling, comprising:
    an input structured to accept a video signal;
    a white generator structured to create an unfiltered white signal from the video signal;
    a cone response generator coupled to the input and structured to generate a set of cone responses from the video signal;
    a spatial center filter structured to generate a spatial center of one of the set of cone responses;
    a spatial surround filter structured to generate a spatial surround of the one of the set of cone responses; and
    a temporal surround filter structured to generate a temporal surround from the spatial center, spatial surround, and the unfiltered white signal.

12. The system of claim 11, further comprising:
    a first mix controller structured to combine the unfiltered white signal with the spatial surround according to a first weighting factor.

13. The system of claim 12, further comprising:
    a second mix controller structured to combine an output from the first mix controller with the spatial center according to a second weighting factor.

14. The system of claim 11, in which the unfiltered white signal comprises a combination of an ambient white signal, a display white signal, and an absolute white signal.

15. The system of claim 11, in which the temporal surround filter further comprises a first low pass filter, a second low pass filter, and a comparator coupled to an input and an output of the second low pass filter.

16. The system of claim 11, further comprising a set of spatial center filters, a set of spatial surround filters, and a set of temporal surround filters for each of the set of cone responses.

17. The system of claim 11 in which the temporal surround filter is a variable rate filter.

18. The system of claim 11 in which the temporal surround filter is an adaptable filter.

19. The system of claim 11 in which the temporal surround filter is an asymmetric filter.

20. The system of claim 11 in which the temporal surround filter is a recursive filter.

* * * * *